United States Patent
Maruta et al.

[15] 3,668,170
[45] June 6, 1972

[54] ADHESIVE COMPOSITION

[72] Inventors: Iwao Maruta, Funabashi-shi; Haruhiko Arai, Narashino-shi; Shozi Horin, Ichikawa-shi, all of Japan

[73] Assignee: Kao Soap Co., Ltd., Tokyo, Japan

[22] Filed: Oct. 20, 1969

[21] Appl. No.: 867,884

[30] Foreign Application Priority Data

Oct. 29, 1968 Japan.....................................43/78754

[52] U.S. Cl................................................260/27, 156/332
[51] Int. Cl. .........................................................C08d 9/12
[58] Field of Search......................................260/27; 156/332

[56] References Cited
UNITED STATES PATENTS 2,676,121  4/1954  Chapman................................260/27
3,419,465  12/1968  Maruta....................................260/27
3,451,890  6/1969  Stump......................................260/27

Primary Examiner—Donald E. Czaja
Assistant Examiner—William E. Parker
Attorney—Woodhams, Blanchard and Flynn

[57] ABSTRACT

A novel adhesive composed of a water-insoluble high molecular weight polyvinyl compound and a water-solubilizing amount of an alkali metal anionic surface active agent, improved by adding a water-soluble polyvalent metal inorganic salt to replace a portion of the alkali metal ions with a polyvalent metal ion. The adhesive is used to attach materials adapted to be subsequently separated by moistening.

4 Claims, No Drawings

ADHESIVE COMPOSITION

This invention relates to a novel and useful adhesive composition consisting essentially of a water-solubilized high molecular compound, which exhibits great differences in adhesive property between the dry state and the wet state and also possesses improved working or processing characteristics.

As is well known in the art, there are many fields of application for adhesive in which the adhesive is required to exhibit a great difference in adhesive property between the dry state and in wet state. For example, in finishing a wall or floor with mosaic tiles, since it is very inefficient to apply tiles one by one with, e.g., cement or mortar to the ground work of a wall or floor, a so-called papered tile prepared by sticking a number of tiles on a piece of, e.g., kraft paper is conventionally used for increasing efficiency and, in this manner, numbers of tiles are applied at one time to a ground work. After solidification of the cement or mortar, the paper is wetted for ease of its removal. As the adhesive used in such papered tiles one is preferred that gives a strong bond between paper and tiles during transportation and application of tiles (in the dry state) but loses its adhesive property for removal of paper (in the wet state). Other applications for such adhesives that will exhibit a great difference in adhesive property between the dry state and in wet state are repapering of paper slides and papered walls.

Hitherto there have been used for this purpose starch and dextrin. These adhesives, however, have the shortcomings, namely, insufficient adhesive property in the dry state and deterioration in bonding strength caused by microbial or photo-inducted degradation. Although carboxy-methylcellulose, sodium alginate and like polysaccharides have often been used as adhesives, they have such shortcomings that the bonding strength before complete drying after application (which strength hereinafter will be referred to as "initial bonding strength") is low, or the bonding strength in the dry state is low. Protein-based adhesives, such as glue or casein, and polyvinyl alcohol (hereinafter will be abbreviated simply as PVA), polyvinyl acetate (hereinafter abbreviated as PVAc), vinyl acetate-maleic anhydride copolymers and like synthetic high molecular compounds, when they are used as the adhesive for papered tiles, exhibit too small a difference in bonding strength between the dry state and in wet state to be stripped off with ease by resetting. Recently, there has been disclosed an adhesive composition comprising PVA and an alkali alkylsulfate as an adhesive for gummed tape. This adhesive is, however, difficult to use as an adhesive for papered tiles because of its poor bonding strength in the dry state to ceramic tiles.

We have previously found an adhesive composition free from such shortcomings as mentioned above which will exhibit a high bonding strength in the dry state but a low bonding strength in the wet state. That is to say, we have previously provided an adhesive composition comprising a solution of a water-insoluble synthetic high molecular polyvinyl compound in an aqueous solution of an anionic surface active agent (this solution in which said high molecular compound has been water-solubilized will hereinafter be referred to as water-solubilized high molecular compound).

However, according to our further study, it has been noted that the use of the water-solubilized high molecular compound as adhesive encounters substantial difficulties depending on the manner of use, because the water-solubilized high molecular compound will generally show a stingy property. Therefore, the brush coating of the water-solubilized high molecular compound will often contaminate by the dropping adhesive liquid the areas other than the areas to which the adhesive liquid has to be applied, due to the stringy property of the water-solubilized high molecular compound. Therefore, in order to avoid such contamination, the coating brush soaked in the adhesive liquid, after withdrawal from the liquid, should be held on the adhesive container until the dropping of the adhesive liquid ceases and then brought to the article to be coated.

Accordingly, it is the primary object of the present invention to provide an adhesive composition having no such stringy property and an improved working property.

As mentioned above, the water-solubilized high molecular compound means solutions of a water-insoluble synthetic high molecular polyvinyl compound in a concentrated aqueous solution of an anionic surface active agent. However, in this anionic surface active agent, the cation of the compound is an alkaline metal ion such as sodium and potassium ions.

We have now discovered that the stringy property of the adhesive consisting of a water-solubilized high molecular compound will be eliminated to give an adhesive having a good working property or processability by replacing a portion of the alkali metal ions of the anionic surface active agent compound used in said water-solubilized high molecular compound by ions of a polyvalent metal such as calcium. Further, it was surprisingly found that the adhesive thus obtained has a special property of forming a gel and completely losing its adhesive property to human skin when shearing stress is given thereto on the surface of the human skin. This means that the adhesive composition according to the present invention is very convenient in its use in that, after application of the adhesive by means of the fingers, the remaining adhesive on the fingers is easily removed without washing as loose particles by rubbing the fingers with each other.

Thus, the adhesive composition according to the present invention is an adhesive composition which comprises a water-solubilized high molecular compound prepared by dissolving a water-insoluble high molecular polyvinyl compound selected from the group consisting of polyvinyl abetate and its derivatives, polyvinyl acetals and copolymers thereof with other copolymerizable monomers in an anionic resinate-type surface active agent consisting essentially of an alkali metal resinate, a portion of alkali metal ions in said rosinate-type surface active agent substituted by polyvalent metal ions.

The water-insoluble synthetic high molecular polyvinyl compound which is used as a raw material for the adhesive in accordance with the present invention includes polyvinyl acetate (which will be abbreviated as PVAc hereinafter) and its derivatives polyvinyl acetals, and copolymers thereof with other copolymerizable monomers. Namely, there are used PVAc and its partial saponification products, partial acetals of polyvinyl alcohol (which will be abbreviated as PVA hereinafter), graft copolymers of vinyl acetate (which will be abbreviated as VAc hereinafter) with PVA, copolymers of VAc with a copolymerizable water-soluble monomer, such as vinylpyrrolidone or maleic anhydride, or a copolymerizable water-insoluble monomer, such as ethyl acrylate, acetalized products of PVA with a lower aliphatic aldehyde, such as formaldehyde, acetaldehyde or butylaldehyde, i.e., polyvinyl acetals such as polyvinylformal, polyvinylacetoacetal and polyvinylbutyral. The PVA for the manufacture of the above acetalized product is unnecessary to be pure polyvinyl alcohol and may be those containing residual combined acetic or like acid in molecule or those obtained by hydrolizing a copolymer of VAc with an other polymerizable compound, such as vinylpyrrolidone, maleic anhydride or ethyl acrylate.

The degree of polymerization of the above high molecular compound is desired to be as high as possible in so far as the high molecular polyvinyl compound is soluble in a concentrated solution of a resinate type anionic surface agent which will be explained hereinafter, and should be at least 10 and preferably within the range of from 100 to 3,000.

SUMMARY OF INVENTION

According to the present invention, as the anionic surface active agent for solubilizing the water-insoluble high molecular polyvinyl compound, a rosinate type anionic surface active agent is used, which includes alkali metal resinates, such as alkali metal salts of rosin acids, e.g. tall oil rosin acids such as those of distilled tall oil or otherwise purified tall oil and adducts of these compounds with an $\alpha, \beta$-unsaturated polybasic acid such as maleic acid and alkali metal salts of such adducts. Among the various kinds of anionic surface active agents, such rosinate type anionic surface active agents as mentioned above are excellent for the purpose of the present invention.

The water-soluble polyvalent metal inorganic salt which is used in the adhesive composition according to the present invention includes polyvalent metal inorganic salts having a solubility in water at 20° C. of at least $10^{-3}$, which will be exemplified by calcium carbonate, calcium chloride, calcium hydrogen phosphate, magnesium chloride, ferric chloride, aluminium sulfate, calcium nitrate and magnesium nitrate.

For the preparation of the adhesive composition in accordance with the present invention, a predetermined quantity of a water-soluble polyvalent metal inorganic salt such as mentioned above will be added to a water-solubilized high molecular compound or, alternately, a portion of alkali metal ions in the resinate type anionic surface agent is substituted by polyvalent metal ions by adding such water-soluble polyvalent metal inorganic salt thereto and then the water-solubilized high molecular compound is prepared by using the resulting mixture of the polyvalent metal salt and alkali metal salt as anionic surface active agent.

The appropriate proportion of the high molecular compound and the surface active agent in the adhesive composition according to the present invention is usually in the range in weight ratio of the former to the latter of 10 : 100 to 100 : 10 i.e. 1 part high molecular compound to from 0.1 to 10 parts of surface active agent.

The optimum amount of added polyvalent metal inorganic salt varies depending upon the kind and proportion to the high molecular compound of the anionic surface active agent employed, but it is generally preferred to use the polyvalent metal inorganic salt in an amount which will be sufficient to neutralize 1 to 20% of carboxyl groups contained in the resinate type surface active agent employed. Less than 1% neutralization is insufficient to improve the stringy property of the water-solubilized high molecular compound, whereas more than 20% neutralization causes a considerable increase of viscosity of the adhesive composition making it necessary to dilute the composition, with unavoidable accompanying decrease in adhesive property.

The preferred method for the preparation of the adhesive according to the present invention comprises adding a predetermined amount of a high molecular compound in the form of granules, blocks or emulsion to a concentrated (usually 10 to 20% by weight) aqueous solution of a resinate type anionic surface active agent, stirring the resulting mixture at a suitable temperature from room temperature to 100° C. and adding to the resulting water-solubilized high molecular compound in the form of solution, a predetermined amount of a water-soluble polyvalent metal inorganic salts as is, or in the form of an aqueous solution.

The adhesive composition of the present invention is obtained usually in the form of an aqueous solution containing about 5 to about 20% by weight solids, and may be put to use as it is or, if desired, after dilution.

The adhesive composition according to the present invention thus obtained exhibits all the strong adhesive property inherent in PVAc or PVAcl in dry state, but the bonding strength will be lowered significantly when rewetted, probably because the adhesive exhibits properties similar to that of the original water-solubilized high molecular compound when rewetted.

The present invention will now be illustrated by the following examples.

EXAMPLE 1

A copolymer of vinyl acetate and ethyl acrylate in a ratio of 1:1 by weight and having a polymerization degree of 800 was dissolved in a 10% by weight aqueous solution of sodium resinate in the proportion of the former to the latter of 1:2 to obtain a water-solubilized high molecular compound (in the form of solution). To the solution was added calcium chloride in amounts, as listed in the following Table 1, which are necessary to substitute in various proportions of the carboxyl groups in sodium resinate contained in the solution. Each 60 mg of respective samples thus obtained was applied to an area of 2.5 × 4 cm² of a piece of kraft paper of 2.5 × 6 cm² by means of a brush and this test piece was stuck on the surfaces of various articles by leaving the remaining area of 2.5 × 2 cm² as the flap for pull-stripping. This was left in air for 1 hour for drying, and the test piece was gradually pulled off perpendicularly to the bonding surface substantially in accordance with the test method defined in JIS ZO 218-1960 to determine the bonding strength by the percentage of break-up of test pieces. The test results of break-up are summarized in the Table 1.

TABLE 1.—PERCENTAGE OF BREAK-UP

| Kinds of bonded articles | Mol percent of carboxyl groups in sodium resinate converted to calcium rosinate | | | | | | | | Other adhesives | | | |
|---|---|---|---|---|---|---|---|---|---|---|---|---|
| | 0% | 2% | 4% | 6% | 8% | 10% | 15% | 20% | PVAc [1] | PVA [2] | Starch | Casein |
| Paper (liner for corrugated cardboard) | 100 | 92 | 95 | 110 | 100 | 100 | 100 | 100 | 100 | 100 | 100 | 100 |
| Wood (ash tree) | 92 | 92 | 87 | 93 | 98 | 100 | 100 | 100 | 75 | 100 | 100 | 50 |
| Stainless steel | 100 | 100 | 100 | 94 | 100 | 100 | 100 | 100 | 0 | 0 | 0 | 0 |
| Glass | 100 | 100 | 100 | 100 | 100 | 100 | 100 | 100 | 100 | 38 | 81 | 100 |
| Neoprene rubber | 100 | 100 | 100 | 100 | 100 | 100 | 100 | 100 | 100 | 30 | 26 | 80 |
| Polyvinyl chloride | 100 | 100 | 100 | 100 | 98 | 100 | 100 | 100 | 0 | 0 | 0 | 90 |
| Flame-treated polyethylene | 100 | 100 | 100 | 100 | 100 | 100 | 100 | 100 | 100 | 25 | 21 | 93 |
| Polypropylene | 100 | 100 | 100 | 97 | 97 | 98 | 95 | 98 | 0 | 0 | 0 | 0 |
| Polytrifluoromonochloroethylene | 100 | 100 | 100 | 100 | 100 | 100 | 100 | 100 | 0 | 0 | 0 | 0 |
| Polystyrene | 100 | 100 | 100 | 100 | 100 | 100 | 100 | 100 | 0 | 0 | 0 | 0 |
| Acrylic resin | 100 | 100 | 100 | 100 | 95 | 100 | 100 | 100 | 48 | 0 | 0 | 0 |
| Melamine resin | 100 | 100 | 100 | 100 | 100 | 100 | 100 | 100 | 0 | 0 | 0 | 0 |
| Urea resin | 100 | 100 | 100 | 100 | 95 | 100 | 100 | 100 | 30 | 0 | 0 | 100 |
| Phenolic resin | 100 | 100 | 100 | 100 | 100 | 100 | 100 | 100 | 0 | 0 | 0 | 12 |

[1] 50% emulsion, polymerization degree of about 11,000.
[2] Polymerization degree of about 1,000.

Also, the test results of the working property for brush coating of the above adhesive compositions were as follows:

| Mol % of carboxyl groups in sodium resinate, converted to calcium rosinate | Working Property |
|---|---|
| 0 | With high stringiness, poor workability |
| 2 | Lowered stringiness, good workability |
| 4 | |
| 6 | Substantially no stringiness, good workability |
| 8 | |
| 10 | High viscosity, no stringiness, good working property, smoothly brushable |
| 15 | |
| 20 | |

If the adhesive composition has a high viscosity as in the case of the 10, 15 and 20 mol % in the above table, it may be appropriately diluted with water before coating.

EXAMPLE 2

A polyvinyl butyral (which will be abbreviated as PVB hereinafter) having a polymerization degree of 1,000 and a degree of acetalization of 35% was dissolved in a 12% by weight aqueous solution of sodium salt of a maleic rosin in the proportion of the high molecular compound TO surface active agent ratio of 1/3 to obtain a clear solution of a water-solubilized high molecular compound. To this water-solubilized high molecular compound there was added calcium chloride, magnesium chloride and aluminium chloride in the amount corresponding to 6 mol % of the carboxyl groups in the sodium salt of maleic rosin, respectively. On the adhesive composition thus obtained there were made the following tests.

1. 0.3 g, calculated as solids, of the adhesive composition was uniformly applied to a single surface of a piece of kraft paper of 15 cm². On this surface was sticked a tile of 25 mm² × 3.5 mm thickness and a weight of 5.6 g., thus obtaining a paper tile. After drying at about 35° C. for 40 minutes, the bonding strength between the tile and the paper was determined by measuring the force required for separating them, reading the scale (g) of the measuring apparatus.

Then the papered surface of another sample of the paper tile was uniformly rewetted and, after 4 minutes, the bonding strength between the paper and tile was determined in the same manner as in the above determination of the bonding strength in dry state.

2. The adhesive composition was applied by a paste brush to a piece of kraft paper of 30 ×30 cm² in order to determine the working property of brush coating.

The test results were shown in Table 2.

TABLE 2

| Kinds of water-soluble polyvalent metal salt | Bonding strength (g) Dry | Wet | Working property |
| --- | --- | --- | --- |
| Calcium chloride | 1620 | 120 | Smoothly brushable |
| Magnesium chloride | 1600 | 130 | Do. |
| Aluminum surfate | 1650 | 100 | Do. |
| None (control) | 1580 | 110 | With high stringiness, poor workability |

Note: Strength of the original paper: 1800 (dry) and 400 (wet).

EXAMPLE 3

3 g of a water-insoluble high molecular compound selected from a PVB having a polymerization degree 800 and a degree of acetalization 60%, a polyvinyl acetoacetal (hereinafter referred to as PVAcl) having a polymerization degree 1,000 and a degree of acetalization 38%, polyvinyl formal (hereinafter referred to as PBF) having a polymerization degree 1,000 and a degree of acetalization 25%, a PVAc having a polymerization degree 1,100 and a partially acetylated polyvinyl alcohol (hereinafter referred to as Ac-PVA) having a polymerization degree 700 and a degree of acetylization 75% was dissolved in a 10% by weight aqueous solution of sodium resinate to form a water-solubilized high molecular compound. 10 mol.% of sodium resinate contained in the water-solubilized high molecular compound thus obtained was converted to a corresponding calcium or magnesium resinate by adding thereto calcium nitrate or magnesium nitrate.

The workability of these adhesive compositions thus obtained were tested and the results were shown in Table 3. The adhesive composition comprising a water-solubilized high molecular compound has a desirable feature that the bonding strength or adhesive property is high in the dry state but low in the wet state regardless of the presence or absence of any water-soluble polyvalent metal inorganic salt, but the working property in brush coating of the adhesive composition was improved remarkably by the addition of a polyvalent metal inorganic salt as shown in Table 3.

TABLE 3

| Kinds of high molecular polyvinyl compound in water-solubilized high molecular compound | Salt added | Working property |
| --- | --- | --- |
| PVB | — | High stringiness, poor workability |
|  | Calcium nitrate | Smoothly brushable |
|  | Magnesium nitrate | Do. |
| PVAcl | — | High stringiness, poor workability |
|  | Calcium nitrate | Smoothly brushable |
|  | Magnesium nitrate | Do. |
| PVF | — | High stringiness, poor workability |
|  | Calcium nitrate | Smoothly brushable |
|  | Magnesium nitrate | Do. |
| Ac–PVA | — | High stringiness, poor workability |
|  | Calcium nitrate | Smoothly brushable |
|  | Magnesium nitrate | Do. |

What we claim is:

1. An adhesive composition consisting essentially of an aqueous solution of (1) one part water-insoluble high molecular weight polyvinyl compound selected from the group consisting of polyvinyl acetate, polyvinyl formal, polyvinyl acetoacetal, polyvinyl butyral, partially saponified polyvinyl acetate, partially acetalized polyvinyl alcohol, graft copolymers of vinyl acetate with polyvinyl alcohol and copolymers of vinyl acetate and a member selected from the group consisting of vinyl pyrrolidone, maleic anhydride and ethyl acrylate, (2) from 0.1 to 10 parts of a solubilizer selected from the group consisting of alkali metal salts of rosin acids and alkali metal salts of adducts of a rosin acid with an $\alpha$, $\beta$-unsaturated polybasic acid, and (3) 1 to 20 mol percent, based on the total carboxyl groups in said solubilizer, of a water-soluble polyvalent metal inorganic salt selected from the group consisting of calcium carbonate, calcium chloride, calcium hydrogen phosphate, magnesium chloride, ferric chloride, aluminum sulfate, calcium nitrate and magnesium nitrate.

2. An adhesive composition according to claim 1 wherein the polyvinyl compound (1) is a copolymer of vinyl acetate and ethyl acrylate, the solubilizer (2) is sodium resinate, and the polyvalent metal salt (3) is calcium chloride.

3. An adhesive composition according to claim 1 wherein the polyvinyl compound (1) is polyvinyl butyral, the solubilizer (2) is the sodium salt of maleic rosin and the polyvalent metal salt (3) is selected from the group consisting of calcium chloride, magnesium chloride and aluminum chloride.

4. An adhesive composition according to claim 1 wherein the solubilizer (2) is sodium resinate and the polyvalent metal salt is selected from the group consisting of calcium nitrate and magnesium nitrate.

* * * * *